(12) United States Patent
Suzuki et al.

(10) Patent No.: US 11,913,391 B2
(45) Date of Patent: Feb. 27, 2024

(54) CONTROLLER AND CONTROL METHOD FOR INTERNAL COMBUSTION ENGINE

(71) Applicant: TOYOTA JIDOSHA KABUSHIKI KAISHA, Aichi-ken (JP)

(72) Inventors: Yuki Suzuki, Kariya (JP); Tomihisa Tsuchiya, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/296,999

(22) Filed: Apr. 7, 2023

(65) Prior Publication Data
US 2023/0323827 A1 Oct. 12, 2023

(30) Foreign Application Priority Data
Apr. 12, 2022 (JP) ................................. 2022-065837

(51) Int. Cl.
*F02D 41/00* (2006.01)
(52) U.S. Cl.
CPC .. *F02D 41/0025* (2013.01); *F02D 2200/0414* (2013.01)
(58) Field of Classification Search
CPC .. F02M 25/02; F02M 25/0227; F02M 25/028; F02D 19/12; F02D 37/02; F02D 41/00; F02D 41/0025; F02D 2200/04; F02D 2200/0414; F02P 5/04; F02P 5/045
See application file for complete search history.

(56) References Cited

U.S. PATENT DOCUMENTS

| | | | | |
|---|---|---|---|---|
| 6,112,705 | A * | 9/2000 | Nakayama | F02M 25/0227 123/25 N |
| 10,267,243 | B2 * | 4/2019 | McQuillen | F02D 41/0085 |
| 10,774,803 | B2 * | 9/2020 | Okada | F02P 5/045 |
| 10,830,186 | B2 * | 11/2020 | Hokazono | F02M 25/0227 |
| 2018/0066599 | A1 | 3/2018 | Narahara et al. | |
| 2018/0066609 | A1 * | 3/2018 | Miller | F02B 77/085 |
| 2019/0277241 | A1 * | 9/2019 | Okada | F02D 41/0025 |
| 2021/0324809 | A1 * | 10/2021 | Yoneya | F02M 25/0227 |
| 2022/0112869 | A1 * | 4/2022 | Marchi | F02B 39/10 |

FOREIGN PATENT DOCUMENTS

JP 2017-218994 A 12/2017
JP 2018-40260 A 3/2018

* cited by examiner

*Primary Examiner* — John Kwon
*Assistant Examiner* — Johnny H Hoang
(74) *Attorney, Agent, or Firm* — HAUPTMAN HAM, LLP

(57) ABSTRACT

A controller for an internal combustion engine is configured to calculate a water collection amount based on a temperature of intake air flowing through an intake passage, the water collection amount being an amount of water that collects on a wall surface of the intake passage, cause a water injection valve to inject water to the intake passage when an intake valve is open, and cause the water injection valve to inject water when the intake valve is closed in addition to when the intake valve is open in a case in which the water collection amount is less than a specified value that has been defined in advance.

12 Claims, 3 Drawing Sheets

CONTROLLER AND CONTROL METHOD FOR INTERNAL COMBUSTION ENGINE

RELATED APPLICATIONS

The present application claims priority of Japanese Patent Application No. 2022-065837 filed Apr. 12, 2022, the disclosure of which is hereby incorporated by reference herein in its entirety.

BACKGROUND

1. Field

The present disclosure relates to a controller and a control method for an internal combustion engine.

2. Description of Related Art

Japanese Laid-Open Patent Publication No. 2017-218994 discloses an internal combustion engine and its controller. The internal combustion engine disclosed in this publication includes cylinders, an intake passage connected to the cylinders, and water injection valves located in the intake passage. The controller disclosed in this publication causes the water injection valves to inject water when the internal combustion engine is in a high-load running state. The water injected by the water injection valves to flow into the corresponding cylinders through the intake passage and evaporates in the cylinders. When the water evaporates, the heat of vaporization lowers the temperatures in the cylinders.

In the technique of supplying water to the cylinders through the intake passage as disclosed in the above publication, the water collects on the wall surface of the intake passage in the form of a film. The smaller the amount of water that collects on the wall surface of the intake passage, the smaller the amount of moisture that evaporates from the wall surface. Thus, the temperature of the entire wall surface of the intake passage increases. Further, the temperature in the intake passage increases. This lowers the relative humidity in the intake passage so that the inside of the entire intake passage becomes relatively dry. When the water injection valves inject water in such a situation, the water in the intake passage readily evaporates before reaching the inside of the cylinders. As a result, there is a possibility that a necessary amount of water cannot be supplied to the cylinders.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for an internal combustion engine. The internal combustion engine includes: a cylinder; an intake passage connected to the cylinder; a water injection valve configured to inject water into the intake passage; a temperature sensor configured to detect a temperature of intake air flowing through the intake passage; and an intake valve configured to selectively open and close a connection port between the intake passage and the cylinder. A period from when the intake valve closes to when the intake valve closes again after opening is referred to as a single cycle. The controller includes processing circuitry. The processing circuitry is configured to execute: a water amount calculation process that calculates a water collection amount based on the temperature of the intake air, the water collection amount being an amount of water that collects on a wall surface of the intake passage; an injection process that causes the water injection valve to inject water when the intake valve is open in the single cycle; and an additional injection process that causes the water injection valve to inject water when the intake valve is closed in the single cycle in addition to the water injection in the injection process in a case in which the water collection amount is less than a specified value that has been defined in advance.

A further aspect of the present disclosure provides a control method for an internal combustion engine. The internal combustion engine includes: a cylinder; an intake passage connected to the cylinder; a water injection valve configured to inject water into the intake passage; and an intake valve configured to selectively open and close a connection port between the intake passage and the cylinder. A period from when the intake valve closes to when the intake valve closes again after opening is referred to as a single cycle. The control method includes: calculating a water collection amount based on a temperature of intake air flowing through the intake passage, the water collection amount being an amount of water that collects on a wall surface of the intake passage; causing the water injection valve to inject water when the intake valve is open in the single cycle; and causing the water injection valve to inject water when the intake valve is closed in the single cycle in addition to when the intake valve is open in a case in which the water collection amount is less than a specified value that has been defined in advance.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of the present disclosure will now be described with reference to the drawings.

Summary of Internal Combustion Engine

Figure 1:
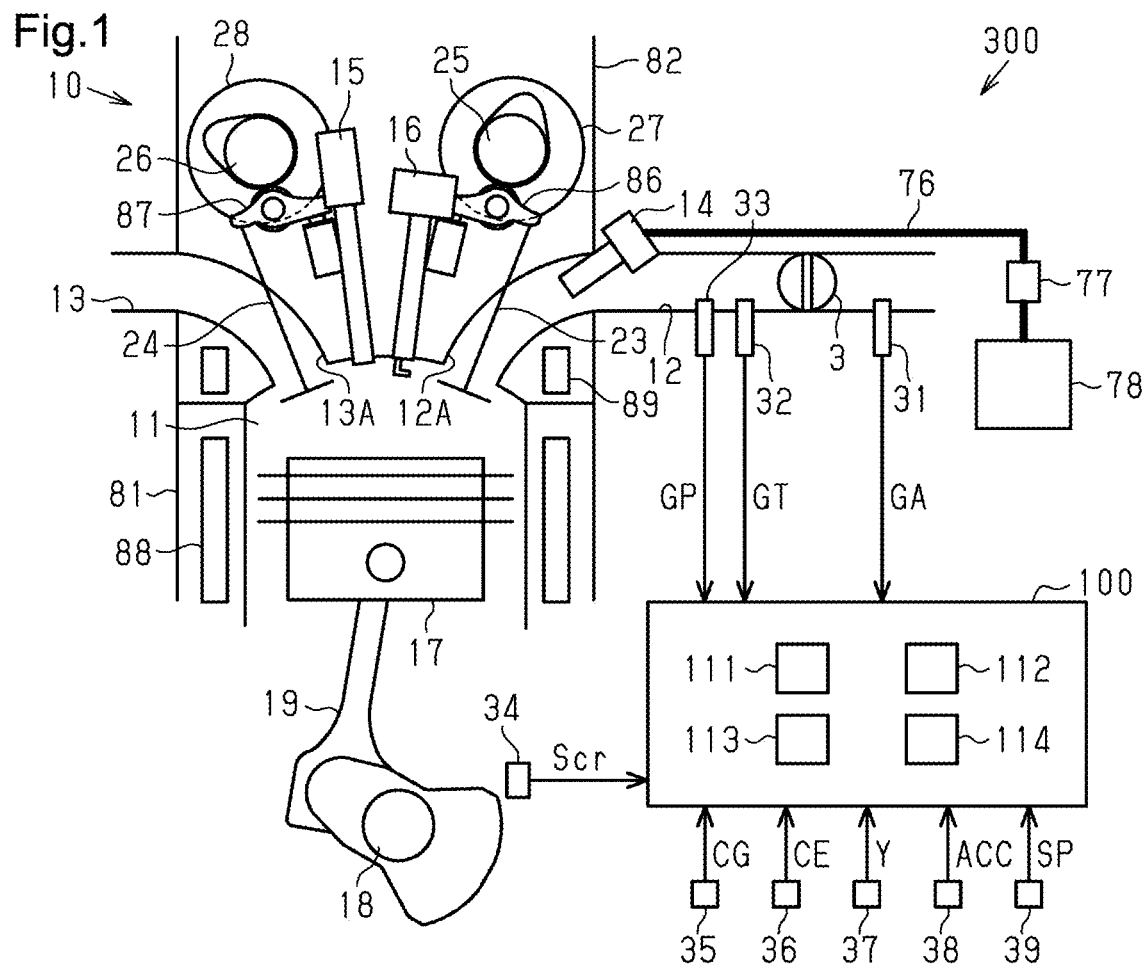
FIG. 1 is a schematic diagram showing the structure of an internal combustion engine.

As shown in FIG. 1, a vehicle 300 includes an internal combustion engine 10. The internal combustion engine 10 is a driving source of the vehicle 300.

The internal combustion engine 10 includes a cylinder block 81, cylinders 11, a first water jacket 88, pistons 17, connecting rods 19, and a crankshaft 18. FIG. 1 shows only one of the cylinders 11. The same applies to the pistons 17 and the connecting rods 19. The number of the cylinders 11 is four. Each cylinder 11 is a space defined in a cylinder block 81. In the cylinder 11, the air-fuel mixture of intake air and fuel burns. Each piston 17 is disposed in a corresponding cylinder 11. The piston 17 is located in the cylinder 11. The piston 17 reciprocates in the cylinder 11. The piston 17 is coupled to the crankshaft 18 by the connecting rod 19. As the piston 17 operates, the crankshaft 18 rotates. The first water jacket 88 is a passage for coolant defined in the cylinder block 81. The first water jacket 88 is located around the cylinders 11.

The internal combustion engine 10 includes a cylinder head 82, ignition plugs 16, and fuel injection valves 15. FIG. 1 shows only one of the ignition plugs 16. The same applies to the fuel injection valves 15. The ignition plugs 16 and the fuel injection valves 15 are attached to the cylinder head 82. Each ignition plug 16 is disposed in a corresponding cylinder 11. The ignition plug 16 ignites the air-fuel mixture in the cylinder 11. Each fuel injection valve 15 is disposed in a corresponding cylinder 11. The fuel injection valve 15 directly injects fuel into the cylinder 11 without using an intake passage 12, which will be described below.

The internal combustion engine 10 includes the intake passage 12 and a throttle valve 3. The intake passage 12 is a passage into which intake air is drawn into each cylinder 11. The intake passage 12 is connected to the cylinders 11. Specifically, the downstream portion of the intake passage 12 has intake ports 12A defined in the cylinder head 82. The intake passage 12 branches into the intake ports 12A at a certain position. FIG. 1 shows only one of the intake ports 12A. Each intake port 12A is disposed in a corresponding cylinder 11. The intake port 12A is connected to the cylinder 11. The throttle valve 3 is located upstream of the intake ports 12A in the intake passage 12. The throttle valve 3 regulates an amount GA of the intake air flowing through the intake passage 12.

The internal combustion engine 10 includes water injection valves 14, a tank 78, a connection passage 76, and a pump 77. Each water injection valve 14 is disposed in a corresponding cylinder 11. FIG. 1 shows only one of the water injection valve 14. The water injection valves 14 are attached to the cylinder head 82. The tip of each water injection valve 14 is located in a corresponding intake port 12A. The water injection valve 14 injects water into the intake port 12A. The water injected by the water injection valve 14 flows through the intake port 12A into the cylinder 11. The tank 78 stores water. The connection passage 76 connects the tank 78 to each water injection valve 14. The pump 77 forcibly delivers the water from the tank 78 to the water injection valve 14. The pump 77 is, for example, an electric pump that is driven by an electric motor. In the present embodiment, the water injection valve 14 is supplied with water having a fixed set pressure that has been defined in advance.

The internal combustion engine 10 includes an exhaust passage 13. The exhaust passage 13 is a passage out of which exhaust gas is discharged from the cylinders 11. The exhaust passage 13 is connected to the cylinders 11. The upstream portion of the exhaust passage 13 has exhaust ports 13A defined in the cylinder head 82. FIG. 1 shows only one of the exhaust ports 13A.

The internal combustion engine 10 includes a second water jacket 89. The second water jacket 89 is a passage for coolant defined in the cylinder head 82. Part of the second water jacket 89 is located around the intake ports 12A. Part of the second water jacket 89 is located around the exhaust ports 13A. The second water jacket 89 connects to the first water jacket 88. Coolant flows from the first water jacket 88 into the second water jacket 89.

The internal combustion engine 10 includes a valvetrain for intake air. The valvetrain for intake air includes intake valves 23, an intake rocker arm 86, an intake camshaft 25, and an intake valve timing varying device 27. The valvetrain for intake air is attached to the cylinder head 82. FIG. 1 shows only one of the intake valves 23. The same applies to the intake rocker arms 86. Each intake valve 23 is disposed in a corresponding intake port 12A. The intake valve 23 is located at a connection port between the intake port 12A and the cylinder 11. The intake valve 23 is coupled to the intake camshaft 25 by the intake rocker arm 86. As the intake camshaft 25 rotates, the intake valve 23 operates to selectively open and close the connection port between the intake port 12A and the cylinder 11. Rotation of the crankshaft 18 is transmitted to the intake camshaft 25. That is, the intake camshaft 25 rotates in conjunction with the crankshaft 18. The intake valve timing varying device 27 changes the rotation position of the crankshaft 18 relative to the rotation position of the intake camshaft 25 (hereinafter referred to as the crank position Scr). This changes the timing of selectively opening and closing the intake valve 23 relative to the crank position Scr. The intake valve timing varying device 27 is, for example, an electric device that is driven by an electric motor.

The internal combustion engine 10 includes a valvetrain for exhaust gas. The valvetrain for exhaust gas includes exhaust valves 24, an exhaust rocker arm 87, an exhaust camshaft 26, and an exhaust valve timing varying device 28. The valvetrain for exhaust gas is attached to the cylinder head 82. FIG. 1 shows only one of the exhaust valve 24. The same applies to the exhaust rocker arms 87. Each exhaust valve 24 is disposed in a corresponding exhaust port 13A. The exhaust valve 24 is located at a connection port between the exhaust port 13A and the cylinder 11. The exhaust valve 24 is coupled to the exhaust camshaft 26 by the exhaust rocker arm 87. As the exhaust camshaft 26 rotates, the exhaust valve 24 operates to selectively open and close the connection port between the exhaust port 13A and the cylinder 11. Rotation of the crankshaft 18 is transmitted to the exhaust camshaft 26. That is, the exhaust camshaft 26 rotates in conjunction with the crankshaft 18. The exhaust valve timing varying device 28 changes the rotation position of the exhaust camshaft 26 relative to the crank position Scr. This changes the timing of selectively opening and closing the exhaust valve 24 relative to the crank position Scr. The exhaust valve timing varying device 28 is, for example, an electric device that is driven by an electric motor.

The internal combustion engine 10 includes a crank position sensor 34, an air flow meter 31, a temperature sensor for intake air (hereinafter referred to as intake air temperature sensor) 32, and an intake pressure sensor 33. The internal combustion engine 10 further includes an intake cam position sensor 35, an exhaust cam position sensor 36, and a coolant temperature sensor 37. The crank position sensor 34 detects the crank position Scr. The air flow meter 31 is located upstream of the throttle valve 3 in the intake passage 12. The air flow meter 31 detects the amount GA of the intake air flowing through the portion of the intake passage 12 where the air flow meter 31 is disposed. The intake air temperature sensor 32 is located in the intake passage 12 on the downstream side of the throttle valve 3 and on the upstream side of the intake ports 12A. The intake air temperature sensor 32 detects a temperature GT of the intake air flowing through the portion of the intake passage 12 where the intake air temperature sensor 32 is disposed. The intake pressure sensor 33 is located in the intake passage 12 on the downstream side of the throttle valve 3 and on the upstream side of the intake ports 12A. The intake pressure sensor 33 detects a pressure GP of the intake air flowing through the portion of the intake passage 12 where the intake pressure sensor 33 is disposed. The intake cam position sensor 35 detects a rotation position CG of the intake camshaft 25. The exhaust cam position sensor 36 detects a rotation position CE of the exhaust camshaft 26. The coolant temperature sensor 37 is located at a downstream end of the second water jacket 89. The coolant temperature sensor 37 detects a temperature Y of coolant at the downstream end. These sensors each repeatedly send a signal corresponding to the detected information to the controller 100 (described later).

The vehicle 300 includes an accelerator sensor 38 and a vehicle speed sensor 39. The accelerator sensor 38 detects an accelerator operation amount ACC, which is the depression amount of the accelerator pedal of the vehicle 300. The vehicle speed sensor 39 detects a vehicle speed SP, which is the travel speed of the vehicle 300. These sensors each repeatedly send a signal corresponding to the detected information to the controller 100 (described later).

Schematic Configuration of Controller

As shown in FIG. 1, the vehicle 300 includes the controller 100. The controller 100 may include processing circuitry including one or more processors that execute various processes in accordance with a computer program (software). The controller 100 may include processing circuitry that includes one or more dedicated hardware circuits such as application specific integrated circuits (ASICs) that execute at least part of various processes or may include processing circuitry that includes a combination of the processors and the dedicated hardware circuits. The processor includes a CPU 111 and a memory 112, such as a RAM or a ROM. The memory 112 stores program codes or instructions configured to cause the CPU 111 to execute the processes. The memory 112, or a computer-readable medium, includes any type of media that are accessible by general-purpose computers and dedicated computers. The controller 100 includes a storage device 113 that is an electrically-rewriteable non-volatile memory. The controller 100 has a clock function. That is, the controller 100 includes a real-time clock 114 that is a circuit for generating information related to date and time.

The controller 100 repeatedly receives detection signals from the various sensors of the vehicle 300. Based on the received detection signals, the controller 100 calculates the following parameters when necessary. Based on the crank position Scr detected by the crank position sensor 34, the controller 100 calculates an engine rotation speed NE, which is the rotation speed of the crankshaft 18. Based on the engine rotation speed NE and the amount GA of the intake air detected by the air flow meter 31, the controller 100 calculates the engine load factor KL. The engine load factor KL is the ratio of the current cylinder inflow air amount to a cylinder inflow air amount obtained during steady operation of the internal combustion engine 10 with the throttle valve 3 fully open at the current engine rotation speed NE. The cylinder inflow air amount refers to the amount of the intake air flowing into one cylinder 11 in the intake stroke.

The controller 100 controls the internal combustion engine 10. Based on the accelerator operation amount ACC, the vehicle speed SP, the engine rotation speed NE, the engine load factor KL, and the like, the controller 100 performs various types of control on the internal combustion engine 10 (e.g., fuel injection by the fuel injection valves 15, the ignition timings of the ignition plugs 16, the adjustment of the open degree of the throttle valve 3). By performing such control, the controller 100 causes air-fuel mixture to sequentially burn in the cylinders 11.

As part of the various control of the internal combustion engine 10, the controller 100 controls the timing of the opening and closing of the intake valves 23 (hereinafter referred to as the intake valve timing) and the timing of the opening and closing of the exhaust valves 24. For example, the controller 100 executes the following control related to the control of the intake valve timing. In the present embodiment, the controller 100 treats, as 0 (initial value), a state in which the intake valve timing is most retarded. By adjusting the advancement amount of the intake valve timing from the initial value, the controller 100 adjusts the intake valve timing. To adjust the intake valve timing, the controller 100 calculates a target advancement amount, which is a target value of the advancement amount of the intake valve timing, based on the engine rotation speed NE, the engine load factor KL, and the like. Then, the controller 100 controls the intake valve timing varying device 27 such that the advancement amount of an actual intake valve timing coincides with the target advancement amount. The controller 100 stores, in advance, the crank position Scr at which the intake valve 23 of each cylinder 11 reaches a valve-opening time TS when the intake valve timing has the initial value. Thus, by calculating a crank position Scr that is advanced from the valve-opening crank position Scr by the target advancement amount, the controller 100 obtains the current crank position Scr at which the intake valve 23 reaches the valve-opening time TS. Likewise, the controller 100 stores, in advance, the crank position Scr at which the intake valve 23 of each cylinder 11 reaches a valve-closing time TC when the intake valve timing has the initial value. This allows the controller 100 to obtain the current crank position Scr at which the intake valve 23 reaches the valve-closing time TC. In such a manner, the controller 100 uses the crank position Scr corresponding to the initial value and the target advancement amount to constantly obtain the crank position Scr at which the intake valve 23 of each cylinder 11 reaches the valve-closing time TS and the crank position Scr at which the intake valve 23 reaches the valve-closing time TC.

Summary of Water Injection Control

Figure 2:
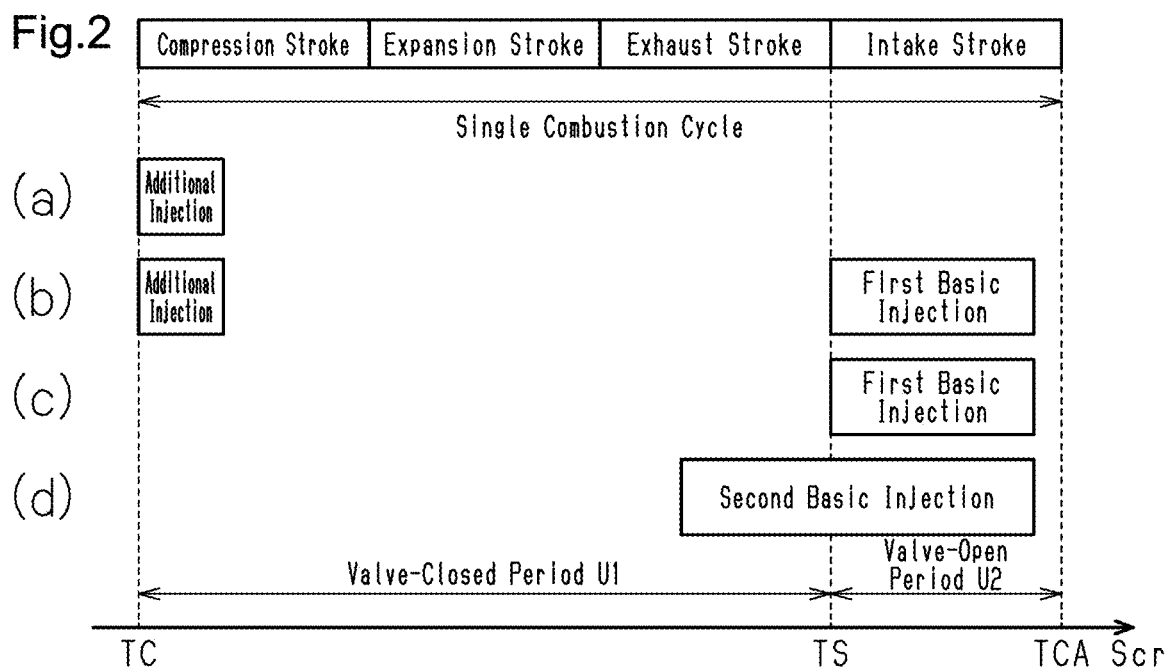
FIG. 2 is a diagram showing how water is injected in the water injection control.

The controller 100 is capable of executing water injection control. The water injection control is executed to control the ignition timing and injection amount of the water from each water injection valve 14. In the present embodiment, a single combustion cycle is defined as a period from when the intake valve 23 of a specific cylinder 11 closes to when the intake valve 23 closes again after opening. That is, as shown in FIG. 2, the single combustion cycle is a period from the valve-closing time TC, at which the intake valve 23 closes, to a valve-closing time TCA, at which the intake valve 23 closes again after the elapse of the valve-opening time TS, at which the intake valve 23 opens. In the single combustion cycle, the specific cylinder 11 enters each of the compression stroke, the expansion stroke, the exhaust stroke, and the intake stroke. The period during which the intake valve 23 is closed (i.e., the period from the valve-closing time TC to the valve-opening time TS of the intake valve 23) is hereinafter referred to as a valve-closed period U1 of the intake valve 23. The period during which the intake valve 23 is open (i.e., the period from the valve-opening time TS to the valve-closing time TCA of the intake valve 23) is hereinafter referred to as a valve-open period U2 of the intake valve 23.

As part of the water injection control, the controller 100 can execute a target calculation process. In the target calculation process, the controller 100 uses the running state of the internal combustion engine 10 to calculate a target injection amount Qs. The target injection amount Qs is a target value of the amount of water supplied to one cylinder 11 during the single combustion cycle. The controller 100 stores a target water amount map M1 in advance as the information used to calculate the target injection amount Qs. The target water amount map M1 represents the relationship between the engine rotation speed NE, the engine load factor KL, and a requested water amount. The requested water amount is the amount of water that needs to be supplied to one cylinder 11 in the single combustion cycle. The target water amount map M1 defines, for example, a requested water amount for each combination of the values of two parameters (namely, the engine rotation speed NE and the engine load factor KL) for coordinates for which the X-axis represents the engine rotation speed NE and the Y-axis represents the engine load factor KL. In the target water amount map M1, the engine rotation speed NE, the engine load factor KL, and the requested water amount have the following relationship. When the engine load factor KL is less than a set load factor (described below), the requested water amount is 0 regardless of whether the engine rotation speed NE is relatively high or low. When the engine load factor KL is greater than or equal to the set load factor (described below), the requested water amount is greater than 0 regardless of whether the engine rotation speed NE is relatively high or low. Specifically, when the engine load factor KL is greater than or equal to the set load factor, the requested water amount increases as the engine load factor KL increases at a certain engine rotation speed NE. The water injected by the water injection valve 14 evaporates in the cylinder 11. When the water evaporates, the heat of vaporization lowers the temperatures in the cylinder 11. The requested water amount set for the target water amount map M1 has a value that allows for cooling in the cylinder 11 that is requested depending on each engine running state. Further, the set load factor is the lowest value of the engine load factor KL at which the temperature in the cylinder 11 needs to be lowered through the supply of water from the water injection valve 14. The target water amount map M1 is created based on, for example, experiments or simulations.

As part of the water injection control, the controller 100 can execute an injection determination process. In the injection determination process, the controller 100 determines whether the target injection amount Qs of water can be injected from the water injection valve 14 during the valve-open period U2 of the intake valve 23 in the single combustion cycle. The maximum value of the amount that can be supplied to each cylinder 11 by injecting water from a corresponding water injection valve 14 during the valve-open period U2 of the intake valve 23 in the single combustion cycle is hereinafter referred to as an allowable injection amount Qv. In the injection determination process, the controller 100 makes the above determination based on whether the target injection amount Qs or the allowable injection amount Qv is larger. The controller 100 stores a reach period L in advance as the information needed to calculate the allowable injection amount Qv. The reach period L is the length of time from when the water injection valve 14 injects water to when the water reaches the inside of the cylinder 11. The reach period L is defined based on, for example, experiments or simulations. In the present embodiment, the reach period L is a fixed value. The controller 100 further stores an injection map M2 in advance as the information needed to calculate the allowable injection amount Qv. The water injection amount obtained when one water injection valve 14 continues to inject water over a certain period is referred to as a possible injection amount. The injection map M2 represents the relationship between the possible injection amount and an injection period during which the water injection valve 14 continues to inject water. In the injection map M2, the possible injection amount becomes larger as the injection period becomes longer. The injection map M2 is created under a prior condition in which the pressure of water supplied to the water injection valve 14 is the set pressure. The injection map M2 is created based on, for example, experiments or simulations.

As part of the water injection control, the controller 100 can execute a first basic injection process. The controller 100 executes the first basic injection process when the determination result of the injection determination process is affirmative. As shown in sections (b) and (c) of FIG. 2, in the first basic injection process, the controller 100 causes the water injection valve 14 to inject the target injection amount Qs of water during the valve-open period U2 of the intake valve 23 in the single combustion cycle. In the present embodiment, the controller 100 causes the water injection valve 14 to start the first basic injection process from the valve-opening time TS of the intake valve 23. When an affirmative determination is made in the injection determination process, the target injection amount Qs may be 0. In this case, the controller 100 causes the water injection valve 14 not to inject any water in the first basic injection process. That is, the water injection valve 14 injects no substantial amount of water.

As part of the water injection control, the controller 100 can execute a second basic injection process. The controller 100 executes the second basic injection process when the determination result of the injection determination process is negative. As shown in section (d) of FIG. 2, in the specific injection process, the controller 100 causes the water injection valve 14 to inject the target injection amount Qs of water from the valve-closed period U1 to the valve-open period U2 of the intake valve 23 in the single combustion cycle.

As part of the water injection control, the controller 100 can execute a water amount determination process. The water injected by the water injection valve 14 collects on the wall surface of the intake port 12A in the form of a film. The portion of the intake port 12A on the downstream side of the tip of the water injection valve 14 is referred to as a target portion. The amount of water that collects on the wall surface of the target portion of one intake port 12A is referred to as a water collection amount W. In the water amount determination process, the controller 100 determines whether the water collection amount W is less than a specified value Wt. The controller 100 calculates the water collection amount W and the specified value Wt, which are necessary for this determination. The method for calculating the water collection amount W will be described later.

The controller 100 stores a saturation water amount map M3 in advance as the information needed to calculate the specified value Wt. At a certain temperature GT of intake air, the larger the water collection amount W, the larger the amount of water vapor that evaporates from the wall surface of the intake port 12A and floats into the space in the intake port 12A. Further, the amount of water vapor contained in the intake air in the intake port 12A (hereinafter simply referred to as the water vapor amount in the intake port 12A) becomes larger. Because of such a causal relationship, the water vapor amount in the intake port 12A may be a saturation water vapor amount when the water collection amount W is sufficiently large. The saturation water vapor amount is the maximum value of the water vapor amount that can be contained in the space of the intake port 12A when the temperature GT of intake air is a certain temperature.

The water collection amount W that allows an actual water vapor amount at the target portion in the intake port 12A to reach the saturation water vapor amount is referred to as a specified water amount. The saturation water amount map M3 represents the relationship between the specified water amount and the temperature GT of intake air. The higher the temperature GT of intake air, the larger the specified water amount in the saturation water amount map M3. The saturation water vapor amount is defined such that the higher the temperature GT of intake air, the larger the saturation water vapor amount. Thus, for the actual water vapor amount in the intake port 12A to reach the saturation water vapor amount when the temperature GT of intake air becomes higher, a larger amount of moisture needs to be evaporated from the wall surface of the intake port 12A. This requires a larger amount of the water collection amount W. Because of such a causal relationship, the saturation water amount map M3 has the above relationship between the temperature GT of intake air and the specified water amount. The saturation water amount map M3 is created based on, for example, experiments or simulations. In the water amount determination process, the controller 100 refers to the saturation water amount map M3 to calculate the specified water amount corresponding to the current temperature GT of intake air as the specified value Wt. That is, the controller 100 sets the specified value Wt to a value defined in advance in the saturation water amount map M3 in correspondence with the temperature GT of intake air. In the setting of the saturation water amount map M3, the controller 100 sets the specified value Wt to be larger as the temperature GT of intake air becomes higher. The temperature GT of intake air in the saturation water amount map M3 is adapted to the temperature GT of intake air at the portion where the intake air temperature sensor 32 is installed. In the same manner as the saturation water amount map M3, adaptation to the installation position of each sensor is made in various maps used for the water injection control.

As part of the water injection control, the controller 100 can execute an additional injection process. When the determination result of the injection determination process is affirmative and the determination result of the water amount determination process is affirmative, the controller 100 executes the additional injection process in addition to causing the target injection amount Qs of water to be injected in the first basic injection process. As shown in sections (a) and (b) of FIG. 2, in the additional injection process, the controller 100 causes the water injection valve 14 to inject an additional injection amount Qad (described later) during the valve-closed period U1 of the intake valve 23 in the single combustion cycle. In the present embodiment, the controller 100 starts the additional injection process from the valve-closing time TC of the intake valve 23. When the determination result of the injection determination process is negative and the determination result of the water amount determination process is affirmative, the controller 100 executes the additional injection process in the same manner. In this case, the controller 100 executes the additional injection process in addition to causing the target injection amount Qs to be injected in the second basic injection process. The changes in the execution of the injection processes shown in FIG. 2 will be described below in the Operation section.

Before executing the additional injection process, the controller 100 calculates the additional injection amount Qad in advance. The controller 100 stores an additional water amount map M4 in advance as the information needed to calculate the additional injection amount Qad. In a situation in which the water collection amount W is smaller than the specified water amount corresponding to the current temperature GT of intake air, the water injection valve 14 may inject water with the intake valve 23 closed. The injection amount of water from one water injection valve 14 for the water collection amount W to reach the specified water amount in this case is referred to as an achieved water amount. Further, the difference between the specified water amount and the water collection amount W is referred to as a water difference value. The additional water amount map M4 represents the relationship between the water difference value and the achieved water amount. The larger the water difference value, the larger the achieved water amount in the additional water amount map M4. The additional water amount map M4 is created based on, for example, experiments or simulations.

To calculate the additional injection amount Qad using the additional water amount map M4, the controller 100 sets, as the current water difference value, the difference between the specified water amount corresponding to the current temperature GT of intake air and the current water collection amount W and applies the current water difference value to the additional water amount map M4. The specified water amount corresponding to the current temperature GT of intake air is the specified value Wt. That is, the controller 100 calculates, as the additional injection amount Qad, the achieved water amount corresponding to the difference value between the specified value Wt and the water collection amount W. Thus, in the setting of the additional water amount map M4, the controller 100 sets the additional injection amount Qad to be larger as the difference between the specified value Wt and the water collection amount W becomes larger.

Water Amount Calculation Process

As part of the water injection control, the controller 100 can execute the water amount calculation process. In the water amount calculation process, the controller 100 calculates the water collection amount W. The controller 100 calculates the current water collection amount W based on parameters including the target injection amount Qs, the temperature GT of intake air, the pressure GP of intake air, the amount GA of intake air, and the temperature Y of coolant. To calculate the water collection amount W, the controller 100 uses a first correction value H1 and a second correction value H2 (described later). Thus, the controller 100 generally calculates the water collection amount W such that the water collection amount W and each parameter have the following relationship. The controller 100 calculates the water collection amount W to be smaller when the temperature GT of intake air becomes higher. The controller 100 calculates the water collection amount W to be smaller when the pressure GP of intake air becomes lower. The controller 100 calculates the water collection amount W to be smaller when the amount GA of intake air becomes larger. The controller 100 calculates the water collection amount W to be smaller when the temperature Y of coolant becomes higher.

To calculate the water collection amount W, the controller 100 calculates a water increase amount Wnw. The water collection amount W is the amount of water that newly collects on the wall surface of the target portion of one intake port 12A from when the previous water amount calculation process was executed to when the current one is executed. The controller 100 stores a first base map N1A in advance as the information needed to calculate the water increase amount Wnw. The temperature GT of intake air may be a specific reference temperature, the pressure GP of intake air may be a specific reference pressure, and the amount GA of intake air may be a specific reference intake air amount. In this situation, a certain amount of water may be injected from each water injection valve 14. The amount of water that newly collects on the wall surface of the target portion of a corresponding intake port 12A is referred to as a new water amount. The first base map N1A represents the relationship between the new water amount and the total amount of water injected by one water injection valve 14. The larger the total amount of water injected by the water injection valve 14, the larger the new water amount in the first base map N1A. The first base map N1A is created based on, for example, experiments or simulations.

The controller 100 stores a first correction map N1B in advance as the information needed to calculate the water increase amount Wnw. The first correction map N1B represents the relationship between the temperature GT of intake air, the pressure GP of intake air, the amount GA of intake air, and the first correction value H1. As described below, the controller 100 multiplies the new water amount by the first correction value H1 to calculate the water increase amount Wnw. The first correction value H1 is set to an optimal value to obtain an accurate water increase amount Wnw through such multiplication. The first correction map N1B defines, for example, the first correction value H1 for each combination of the values of three parameters (namely, the temperature GT of intake air, the pressure GP of intake air, the amount GA of intake air) for coordinates for which the X-axis represents the temperature GT, the Y-axis represents the pressure GP, and the Z-axis represents the amount GA.

The first correction value H1 and each parameter of the first correction map N1B have the following relationship. First, the relationship between the temperature GT of intake air and the first correction value H1 will be described. When the pressure GP of intake air and the amount GA of intake air each have a certain value, the first correction value H1 becomes smaller as the temperature GT of intake air becomes higher. Next, the relationship between the pressure GP of intake air and the first correction value H1 will be described. When the temperature GT of intake air and the amount GA of intake air each have a certain value, the first correction value H1 becomes smaller as the pressure GP of intake air becomes lower. Next, the relationship between the amount GA of intake air and the first correction value H1 will be described. When the temperature GT of intake air and the pressure GP of intake air each have a certain value, the first correction value H1 becomes smaller as the pressure GP of intake air becomes larger. The reason for setting the above relationship between the first correction value H1 and each parameter of the first correction map N1B will be described in the Operation section. In the first correction map N1B, when the temperature GT of intake air is the reference temperature, the pressure GP of intake air is the reference pressure, and the amount GA of intake air is the reference intake air amount, the first correction value H1 is 1.

To calculate the water collection amount W, the controller 100 calculates a total evaporation amount Wep. The total evaporation amount Wep is the amount of water that evaporates from the wall surface of the target portion of one intake port 12A from when the previous water amount calculation process was executed to when the current one is executed. The controller 100 stores a second base map N2A in advance as the information needed to calculate the total evaporation amount Wep. The temperature GT of intake air may be a specific reference temperature, the temperature Y of coolant may be a specific reference coolant temperature, and the amount GA of intake air may be a specific reference intake air amount. The amount of water that evaporates from the wall surface of the target portion of one intake port 12A during a certain period is referred to as an in-period evaporation amount. The second base map N2A represents the relationship between the length of time and the in-period evaporation amount. The longer the length of time, the larger the in-period evaporation amount in the second base map N2A. The second base map N2A is created based on, for example, experiments or simulations.

The controller 100 stores a second correction map N2B in advance as the information needed to calculate the total evaporation amount Wep. The second correction map N2B represents the relationship between the temperature GT of intake air, the temperature Y of coolant, and the second correction value H2. As described below, the controller 100 multiplies the second correction value H2 by the in-period evaporation amount to calculate the total evaporation amount Wep. The second correction value H2 is set to an optimal value to obtain an accurate total evaporation amount Wep through such multiplication. The second correction map N2B defines, for example, the second correction value H2 for each combination of the values of three parameters (namely, the temperature GT of intake air, the temperature Y of coolant, the amount GA of intake air) for coordinates for which the X-axis represents the temperature GT, the Y-axis represents the temperature Y, and the Z-axis represents the amount GA. The second correction map N2B is created based on, for example, experiments or simulations.

The second correction value H2 and each parameter of the second correction map N2B have the following relationship. First, the relationship between the temperature GT of intake air and the second correction value H2 will be described. When the temperature Y of coolant and the amount GA of intake air each have a certain value, the second correction value H2 becomes larger as the temperature GT of intake air becomes higher. Next, the relationship between the temperature Y of coolant and the second correction value H2 will be described. When the temperature GT of intake air and the amount GA of intake air each have a certain value, the second correction value H2 becomes larger as the temperature Y of coolant becomes higher. Next, the relationship between the amount GA of intake air and the second correction value H2 will be described. When the temperature GT of intake air and the temperature Y of coolant each have a certain value, the second correction value H2 becomes larger as the amount GA of intake air becomes larger. The reason for setting the above relationship between the second correction value H2 and each parameter of the second correction map N2B will be described in the Operation section. In the second correction map N2B, when the temperature GT of intake air is the reference temperature, the temperature Y of coolant is the reference coolant temperature, and the amount GA of intake air is the reference intake air amount, the second correction value H2 is 1.

Detailed Processing Procedure of Water Injection Control

The series of processes related to the water injection control described below are executed for one cylinder 11. That is, the controller 100 executes the series of processes related to the water injection control for each cylinder 11. When the internal combustion engine 10 is running (i.e., when the engine rotation speed NE is greater than 0), the controller 100 repeatedly executes the water injection control. For each cylinder 11, the controller 100 executes the series of processes related to the water injection control once in a single combustion cycle. The controller 100 starts the water injection control at the start time of the single combustion cycle (i.e., the valve-closing time TC of the intake valve 23). Based on the newest crank position Scr received from the crank position sensor 34, the controller 100 determines the time of starting the water injection control. That is, when the newest crank position Scr coincides with the crank position Scr at which the intake valve 23 reaches the valve-closing time TC, the controller 100 determines that the intake valve 23 has reached the valve-closing time TC. Likewise, when starting the first basic injection process and the second basic injection process (described below), the controller 100 refers to the newest crank position Scr to determine that the intake valve 23 has reached the valve-opening time TS. Although the details will not be described, the valve-closing time TC and the valve-opening time TS of the intake valve 23 referred to and used by the controller 100 in the series of processes of the water injection control are related to the cylinder 11 for which the water injection control is executed.

Figure 3:
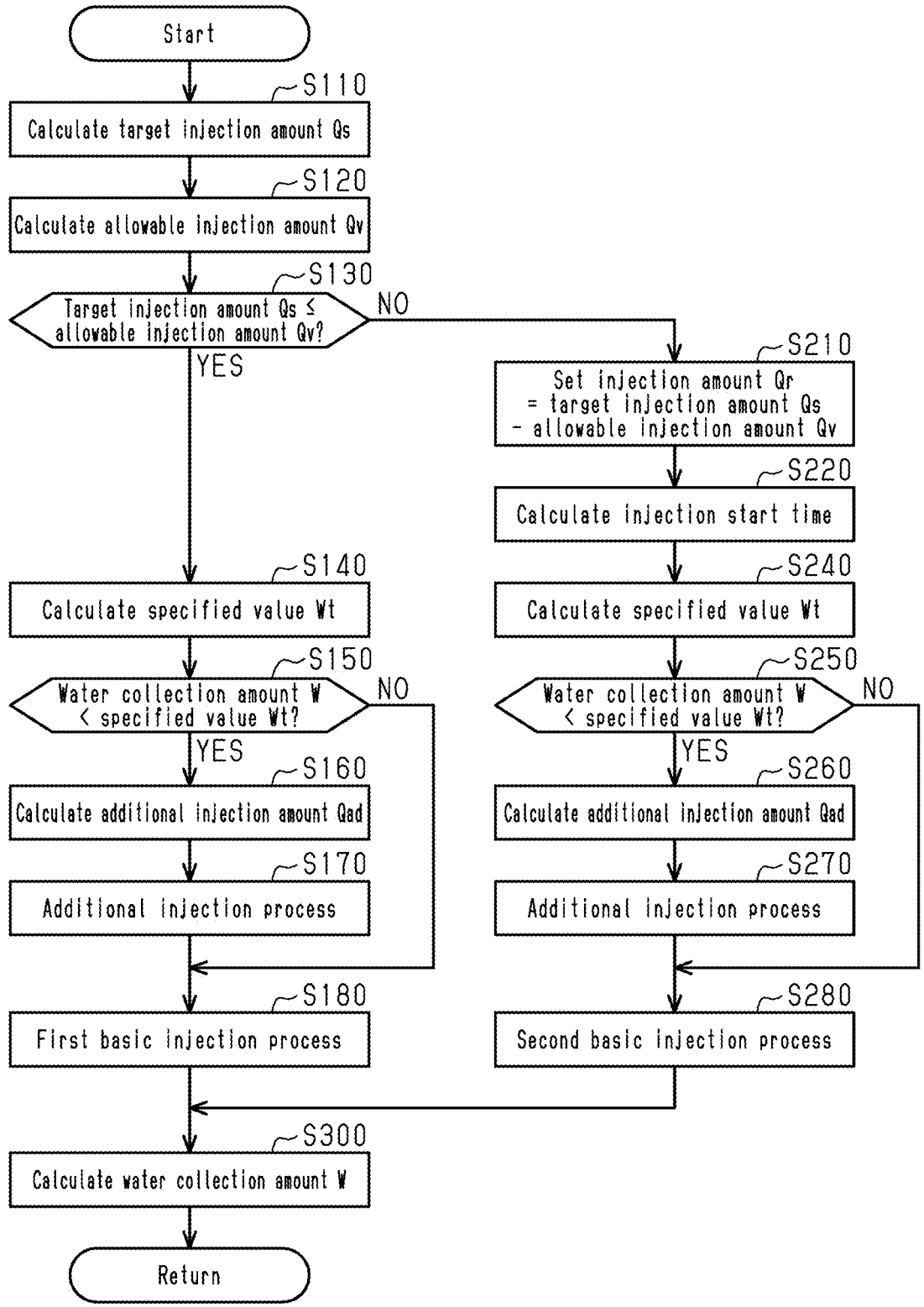
FIG. 3 is a flowchart illustrating a procedure of the water injection control.

As shown in FIG. 3, when starting the water injection control, the controller 100 first executes the process of step S110. In step S110, the controller 100 calculates the target injection amount Qs. Specifically, the controller 100 refers to the newest engine rotation speed NE, the newest engine load factor KL, and the target water amount map M1. As described above, the target water amount map M1 represents the relationship between the engine rotation speed NE, the engine load factor KL, and the requested water amount, which is the amount of water that needs to be supplied to the cylinder 11. Based on the target water amount map M1, the controller 100 calculates, as the target injection amount Qs, the requested water amount corresponding to the newest engine rotation speed NE and the newest engine load factor KL. Subsequently, the controller 100 advances the process to step S120. The process of step S110 is the target calculation process.

In step S120, the controller 100 calculates the allowable injection amount Qv. As described below, the allowable injection amount Qv is the amount of water that can be injected by the water injection valve 14 during a period in the valve-open period U2 of the intake valve 23 excluding the reach period L. The reach period L is the length of time to when the water injected by the water injection valve 14 reaches the inside of the cylinder 11. To calculate the allowable injection amount Qv, the controller 100 first uses the newest engine rotation speed NE to convert the reach period L into a crank rotation amount corresponding to the newest engine rotation speed NE. Then, the controller 100 sets the obtained crank rotation amount as an offset value. The crank rotation amount represents the rotation angle of the crankshaft 18 obtained when the crankshaft 18 rotates from a rotation position to another rotation position. The higher the engine rotation speed NE, the larger the offset value. After calculating the offset value, the controller 100 calculates a limit crank position. Specifically, the controller 100 calculates the crank position Scr before, by the offset value, the crank position Scr at which the intake valve 23 reaches the valve-closing time TCA as the limit crank position. As shown in FIG. 2, the valve-closing time TCA is the end time of the current combustion cycle. After calculating the limit crank position, the controller 100 calculates an allowable rotation amount. The allowable rotation amount is a crank rotation amount from the crank position Scr at which the intake valve 23 reaches the valve-opening time TS to the limit crank position. After calculating the allowable rotation amount, the controller 100 uses the newest engine rotation speed NE to convert the allowable rotation amount into the length of a time that corresponds to the newest engine rotation speed NE. Then, the controller 100 sets the obtained value as an allowable period. At the same allowable rotation amount, the higher the engine rotation speed NE, the shorter the allowable period. Next, the controller 100 refers to the injection map M2. As described above, the injection map M2 represents the relationship between the injection period and the possible injection amount. The controller 100 uses the injection map M2 to calculate, as the allowable injection amount Qv, the possible injection amount corresponding to the allowable period. As shown in FIG. 3, after calculating the allowable injection amount Qv, the controller 100 advances the process to step S130.

In step S130, the controller 100 determines whether the target injection amount Qs is less than or equal to the allowable injection amount Qv. That is, in the injection determination process, the controller 100 determines whether the target injection amount Qs of water can be injected from the water injection valve 14 during the valve-open period U2 of the intake valve 23 in the single combustion cycle. When determining that the target injection amount Qs calculated in step S110 is less than or equal to the allowable injection amount Qv calculated in step S120, the controller 100 determines that the target injection amount Qs of water can be injected from the water injection valve 14 (step S130: YES). In this case, the controller 100 advances the process to step S140. The process of step S130 is the injection determination process.

In step S140, the controller 100 calculates the specified value Wt, which will be used in the subsequent step S150. Specifically, the controller 100 refers to the saturation water amount map M3 and the newest temperature GT received from the intake air temperature sensor 32. As described above, the saturation water amount map M3 represents the relationship between the specified water amount and the temperature GT of intake air. The specified water amount is the water collection amount W that allows an actual water vapor amount in the intake port 12A to reach the saturation water vapor amount. Based on the saturation water amount map M3, the controller 100 calculates the specified water amount corresponding to the newest temperature GT of intake air as the specified value Wt. Subsequently, the controller 100 advances the process to step S150.

In step S150, the controller 100 determines whether the water collection amount W is less than the specified value Wt. Specifically, the controller 100 refers to the newest water collection amount W and the specified value Wt calculated in step S140. The newest water collection amount W is the water collection amount W that was calculated in step S300 (described later) when the previous water injection control was executed. When the water collection amount W is greater than or equal to the specified value Wt (step S150: NO), the controller 100 skips the processes of step S160 and step S170 and advances the process to step S180.

In step S150, when determining that the water collection amount W is less than the specified value Wt (step S150: YES), the controller 100 advances the process to step S160. The process of step S150 is the water amount determination process.

In step S160, the controller 100 calculates the additional injection amount Qad. Specifically, the controller 100 refers to the additional water amount map M4. As described above, the additional water amount map M4 represents the relationship between the water difference value and the achieved water amount. The water difference value is the difference value between the specified water amount and the water collection amount W. The achieved water amount is the injection amount of water from one water injection valve 14 for the water collection amount W to reach the specified water amount. To calculate the additional injection amount Qad using the additional water amount map M4, the controller 100 first calculates, as a difference value ΔW, the value obtained by subtracting the newest water collection amount W from the specified value Wt calculated in step S140. The specified water amount calculated in step S140 is the specified water amount corresponding to the current temperature GT of intake air. After calculating the difference value ΔW, the controller 100 uses the additional water amount map M4 to calculate the achieved water amount corresponding to the difference value ΔW as the additional injection amount Qad. Then, the controller 100 advances the process to step S170. After starting the water injection control, the controller 100 immediately executes the processes of step S110 to S160. Thus, the time at which the process is advanced to the next step S170 is regarded as being equal to the start time of the single combustion cycle (i.e., the valve-closing time TC of the intake valve 23).

In step S170, the controller 100 immediately executes the additional injection process. Then, the controller 100 causes the water injection valve 14 to inject the additional injection amount Qad of water calculated in step S160. In this manner, the controller 100 starts the additional injection process from the valve-closing time TC of the intake valve 23. When the injection of water by the additional injection amount Qad is completed, the controller 100 advances the process to step S180. The additional injection amount Qad is an extremely small amount. Thus, the additional injection process ends before the valve-opening time TS of the intake valve 23.

In step S180, the controller 100 executes the first basic injection process. Specifically, the controller 100 waits until the valve-opening time TS of the intake valve 23. When the valve-opening time TS of the intake valve 23 is reached, the controller 100 causes the water injection valve 14 to inject water by the target injection amount Qs calculated in step S110. Subsequently, the controller 100 advances the process to step S300.

In step S300, the controller 100 calculates the water collection amount W. The process of step S300 will be described in detail below. After executing the process of step S300, the controller 100 temporarily ends the series of processes related to the water injection control. When the start time of a single combustion cycle is reached, the controller 100 executes the process of step S110 again.

When determining in step S130 that the target injection amount Qs is greater than the allowable injection amount Qv (step S130: NO), the controller 100 advances the process to step S210. In this case, the controller 100 executes the second basic injection process.

In step S210, the controller 100 calculates the set injection amount Qr, which is the difference between the target injection amount Qs and the allowable injection amount Qv. Specifically, the controller 100 sets the set injection amount Qr to the value obtained by subtracting the allowable injection amount Qv from the target injection amount Qs. Subsequently, the controller 100 advances the process to step S220.

In step S220, the controller 100 calculates an injection start time of the second basic injection process. Specifically, the controller 100 refers to the injection map M2 and the set injection amount Qr calculated in step S210. Then, the controller 100 refers to the injection map M2 to calculate, as a set injection period, the injection period corresponding to the set injection amount Qr. Subsequently, the controller 100 uses the newest engine rotation speed NE to convert the set injection period into a crank rotation amount corresponding to the newest engine rotation speed NE. Then, the controller 100 sets the obtained crank rotation amount as the set rotation amount. Subsequently, the controller 100 sets the injection start time of the second basic injection process to the crank position Scr that is before, by the set rotation amount, the crank position Scr at which the intake valve 23 reaches the valve-opening time TS. After calculating the injection start time, the controller 100 advances the process to step S240.

In step S240, the controller 100 calculates the specified value Wt in the same manner as step S140. Subsequently, the controller 100 advances the process to step S250.

In step S250, the controller 100 determines whether the newest water collection amount W is less than the specified value Wt. When the water collection amount W is greater than or equal to the specified value Wt (step S250: NO), the controller 100 skips the processes of step S260 and step S270 and advances the process to step S280. The newest water collection amount W of step S250 is the same as that of step S150.

In step S250, when determining that the newest water collection amount W is less than the specified value Wt (step S250: YES), the controller 100 advances the process to step S260. The controller 100 calculates the additional injection amount Qad in the same manner as step S160. In this step, the controller 100 needs to calculate the difference value ΔW using the specified value Wt calculated in step S240. Subsequently, the controller 100 advances the process to step S270. In the same manner as step S170, the time at which the process is advanced to the next step S270 is regarded as being equal to the start time of the single combustion cycle (i.e., the valve-closing time TC of the intake valve 23).

In step S270, the controller 100 executes the additional injection process in the same manner as step S170. Subsequently, the controller 100 advances the process to step S280.

In step S280, the controller 100 executes the second basic injection process. Specifically, the controller 100 waits until the injection start time of the second basic injection process calculated in step S220. When the injection start time of the intake valve 23 is reached, the controller 100 causes the water injection valve 14 to inject water by the target injection amount Qs calculated in step S110. Subsequently, the controller 100 advances the process to step S300.

Detailed Processing Procedure of Water Amount Calculation Process

The specific procedure of the water amount calculation process will now be described. The controller 100 executes the following series of processes in step S300. In the series of processes, the controller 100 calculates the water increase amount Wnw and the total evaporation amount Wep. The water increase amount W is the amount of water that newly collects on the wall surface of the intake port 12A from when the previous water amount calculation process was executed to when the current one is executed. The total evaporation amount Wep is the amount of water that evaporates from the wall surface of the intake port 12A from when the previous water amount calculation process was executed to when the current one is executed.

Figure 4:
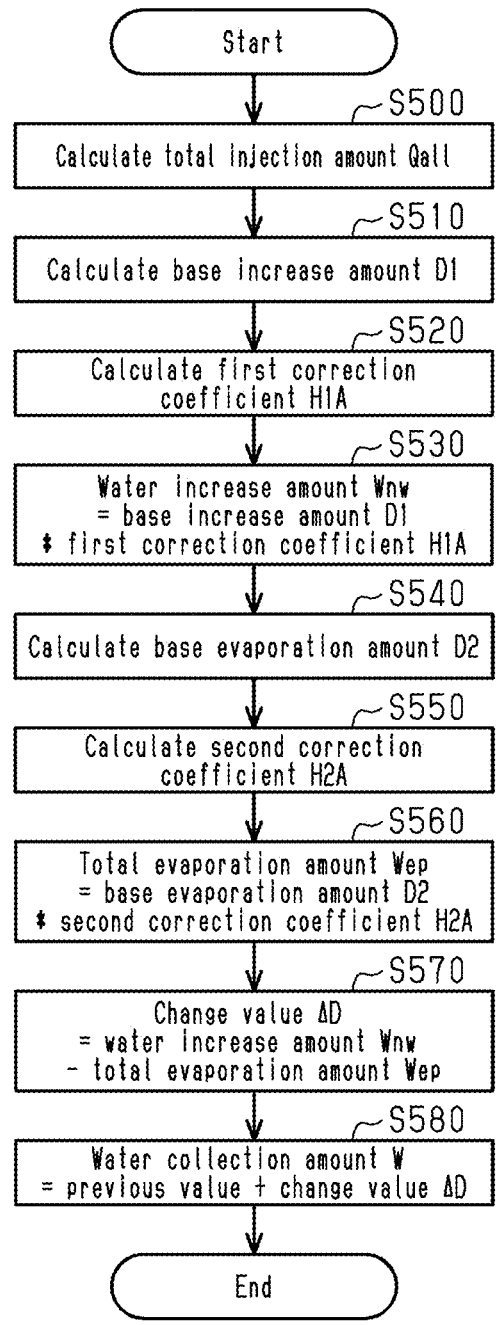
FIG. 4 is a flowchart illustrating a procedure of the water amount calculation process.

As shown in FIG. 4, the controller 100 first executes the process of step S500. In step S500, the controller 100 calculates a total injection amount Qall of water injected through the current water injection control. Specifically, when the additional injection process is not executed in the current water injection control, the controller 100 sets the total injection amount Qall to only the target injection amount Qs calculated in step S110. When the additional injection process is executed in the current water injection control, the controller 100 sets the total injection amount Qall to the sum of the target injection amount Qs calculated in step S110 and the additional injection amount Qad calculated in step S160 or step S260. Subsequently, the controller 100 advances the process to step S510.

In step S510. the controller 100 calculates a base increase amount D1 that serves as a base value of the water increase amount Wnw. Specifically, the controller 100 refers to the first base map N1A. As described above, the first base map N1A represents the relationship between the new water amount and the total amount of water injected by the water injection valve 14. The new water amount is the amount of water that newly collects on the wall surface of the intake port 12A when water is injected from the water injection valve 14. Based on the first base map N1A, the controller 100 calculates, as the base increase amount D1, the new water amount corresponding to the total injection amount Qall calculated in step S500. Subsequently, the controller 100 advances the process to step S520.

In step S520, the controller 100 calculates a first correction coefficient H1A. The first correction coefficient H1A is an optimal first correction value H1 corresponding to the intake port 12A in the current state. Specifically, the controller 100 refers to the newest temperature GT of intake air received from the intake air temperature sensor 32, the newest pressure GP of intake air received from the intake pressure sensor 33, and the newest amount GA of intake air received from the air flow meter 31. Further, the controller 100 refers to the first correction map N1B. As described above, the first correction map N1B represents the relationship between the temperature GT of intake air, the pressure GP of intake air, the amount GA of intake air, and the first correction value H1. Based on the first correction map N1B, the controller 100 calculates the first correction value H1 corresponding to the newest temperature GT of intake air, the newest pressure GP of intake air, and the newest amount GA of intake air as the first correction coefficient H1A. Subsequently, the controller 100 advances the process to step S530.

In step S530, the controller 100 calculates the water increase amount Wnw. Specifically, the controller 100 multiplies the first correction coefficient H1A calculated in step S520 by the base increase amount D1 calculated in step S510. Then, the controller 100 sets the obtained value as the water increase amount Wnw. Subsequently, the controller 100 advances the process to step S540.

In step S540, the controller 100 calculates a base evaporation amount D2 that serves as a base value of the total evaporation amount Wep. Specifically, the controller 100 calculates, as an evaporation period, the length of time from when the previous water amount calculation process was executed to the current one is executed. Based on the newest engine rotation speed NE, the controller 100 converts the crank rotation amount for the current single combustion cycle into the length of time corresponding to the newest engine rotation speed NE. The controller 100 sets the obtained value as the evaporation period. After calculating the evaporation period, the controller 100 refers to the second base map N2A. As described above, the second base map N2A represents the relationship between the length of time and the in-period evaporation amount. The in-period evaporation amount is the amount of water that evaporates from the wall surface of the intake port 12A during a certain period. Based on the second base map N2A, the controller 100 calculates the in-period evaporation amount corresponding to the evaporation period as the base evaporation amount D2. Subsequently, the controller 100 advances the process to step S550.

In step S550, the controller 100 calculates a second correction coefficient H2A. The second correction coefficient H2A is an optimal second correction value H2 corresponding to the intake port 12A in the current state. Specifically, the controller 100 refers to the newest temperature GT of intake air received from the intake air temperature sensor 32, the newest temperature Y of coolant received from the coolant temperature sensor 37, and the newest amount GA of intake air received from the air flow meter 31. Further, the controller 100 refers to the second correction map N2B. As described above, the second correction map N2B represents the relationship between the temperature GT of intake air, the temperature Y of coolant, and the second correction value H2. Based on the second correction map N2B, the controller 100 calculates the second correction value H2 corresponding to the newest temperature GT of intake air, the newest temperature Y of coolant, and the newest amount GA of intake air as the second correction coefficient H2A. Subsequently, the controller 100 advances the process to step S560.

In step S560, the controller 100 calculates the total evaporation amount Wep. Specifically, the controller 100 multiplies the second correction coefficient H2A calculated in step S550 by the base evaporation amount D2 calculated in step S540. Then, the controller 100 sets the obtained value as the total evaporation amount Wep. Subsequently, the controller 100 advances the process to step S570.

In step S570, the controller 100 calculates a change value $\Delta D$ of the amount of the water on the wall surface of the intake port 12A from when the previous water amount calculation process was executed to when the current one is executed. First, the controller 100 sets, as the change value $\Delta D$, the value obtained by subtracting the total evaporation amount Wep calculated in step S560 from the water increase amount Wnw calculated in step S530. Subsequently, the controller 100 advances the process to step S580.

In step S580, the controller 100 calculates the newest water collection amount W. First, the controller 100 sets, as the newest water collection amount W, the value obtained by adding the change value $\Delta D$ calculated in step S570 to the previous value of the water collection amount W. The previous value of the water collection amount W is the water collection amount W that was calculated in step S580 when the controller 100 executed the previous water injection control. When calculating the water collection amount W, the controller 100 stores the water collection amount W in the storage device 113. Further, the controller 100 deletes the water collection amount W that had previously been stored. Thus, the controller 100 constantly stores the newest water collection amount W. Subsequently, the controller 100 ends the series of processes related to the water amount calculation process.

When the internal combustion engine 10 is not running, the controller 100 does not execute the water injection control. Thus, when the internal combustion engine 10 is not running, the water collection amount W is not updated through the water amount calculation process. However, when the internal combustion engine 10 is not running, water may evaporate from the wall surface of the intake port 12A and thus the actual water collection amount W may decrease. Taking this problem into account, in a case in which the water injection control will be executed for the first time after the internal combustion engine 10 is started, the controller 100 executes a first-time process that updates the water collection amount W before starting the water injection control. Specifically, the controller 100 executes the following series of processes. First, the controller 100 uses the information calculated by the real-time clock 114 to obtain a deactivation period from when the internal combustion engine 10 stops running to when the internal combustion engine 10 is started. Next, the controller 100 uses the second base map N2A to calculate the in-period evaporation amount corresponding to the deactivation period as the base evaporation amount D2. Further, the controller 100 uses the second correction map N2B to calculate, as the second correction coefficient H2A, the second correction value H2 corresponding to the temperature GT of intake air, the temperature Y of coolant, and the amount GA of intake air that are obtained at the point in time when the internal combustion engine 10 is started. Then, the controller 100 sets the product of the base evaporation amount D2 and the second correction coefficient H2A as the total evaporation amount Wep of the deactivation period. Subsequently, the controller 100 subtracts the total evaporation amount Wep from the last water collection amount W that was calculated before the internal combustion engine 10 stopped running. The controller 100 sets the obtained value as the newest water collection amount W. These processes are included in the first-time process. In the process that refers to the water injection control when executing the water injection control for the first time after the internal combustion engine 10 is started, the controller 100 refers to the water collection amount W updated in the first-time process. The process that refers to the water collection amount W is step S150 or step S250. In relation to the first-time process, the controller 100 treats the evaporation period as 0 in step S540 when executing the water injection control for the first time after the internal combustion engine 10 is started.

Operation of Embodiment

Manner of Water Injection with Water Injection Control

When the target injection amount Qs is greater than the allowable injection amount Qv (step S130: NO) and the water collection amount W is greater than or equal to the specified value Wt (step S250: NO), the controller 100 executes the second basic injection process (step S280). That is, as shown in section (d) of FIG. 2, the water injection valve 14 injects water from the valve-closed period U1 to the valve-open period U2 of the intake valve 23. The water injected by the water injection valve 14 during the valve-closed period U1 of the intake valve 23 remains in the intake port 12A until the valve-opening time TS of the intake valve 23. Thus, the water may collect on the wall surface of the intake port 12A. Accordingly, when the second basic injection process is executed, a sufficient water collection amount W is highly likely to be kept.

Depending on the running state of the internal combustion engine 10, the target injection amount Qs may be less than or equal to the allowable injection amount Qv (step S130: YES) and the water collection amount W may be greater than or equal to the specified value Wt (step S150: NO). In this case, as shown in section (c) of FIG. 2, the controller 100 executes the first basic injection process from the valve-opening time TS of the intake valve 23 (step S180). That is, unlike the second basic injection process, the water injection valve 14 injects water only during the valve-open period U2 of the intake valve 23. When water is injected from the water injection valve 14 during the valve-open period U2 of the intake valve 23, most of the injected water reaches the inside of the cylinder 11. That is, the water does not readily collect on the wall surface of the intake port 12A. Thus, if the first basic injection process continues to be executed, the amount of water that newly collects on the wall surface of the intake port 12A will not significantly increase. In contrast, the water that originally collected on the wall surface of the intake port 12A evaporates, and the water and intake air flow into the cylinder 11 during the valve-open period U2 of the intake valve 23. As a result, if the first basic injection process continues to be executed, the water collection amount W may gradually decrease and then become less than the specified value Wt. In this case, the intake port 12A becomes relatively dry. If the first basic injection process is executed in this situation, the injected water may evaporate in the intake port 12A before reaching the inside of the cylinder 11. Consequently, the target injection amount Qs of water may fail to be supplied to the cylinder 11.

To solve this problem, when the water collection amount W is less than the specified value Wt (step S150: YES), the controller 100 of the present embodiment executes the following steps. The controller 100 executes not only the first basic injection process in the valve-open period U2 of the intake valve 23 (step S180) but also the additional injection process in the valve-closed period U1 of the intake valve 23 (step S170). As described above, the water injected by the water injection valve 14 during the valve-closed period U1 of the intake valve 23 may remain in the intake port 12A and collect on the wall surface of the intake port 12A. This increases the water collection amount W to be greater than or equal to the specified value Wt. There is also a possibility that the water collection amount W does not increase to be greater than or equal to the specified value Wt through a single additional injection process. In this case, the controller 100 repeats the additional injection process in multiple combustion cycles. This will eventually increase the water collection amount W to be greater than or equal to the specified value Wt.

The controller 100 may execute such an additional injection process in addition to the above second basic injection process. When the water collection amount W is relatively small in the situation in which the second basic injection process is executed, the water collection amount W can be increased through the additional injection process in the same manner as the above.

A situation in which the target injection amount Qs is 0 (i.e., water is not injected from the water injection valve 14) may continue. Examples of this situation include a situation in which the internal combustion engine 10 remains running with a relatively low engine load factor KL. In such a case, the water collection amount W may decrease to be less than the specified value Wt. This satisfies the condition in which the target injection amount Qs is less than or equal to the allowable injection amount Qv (step S130: YES) and the condition in which the water collection amount W is less than the specified value Wt (step S150). As a result, as shown in section (a) of FIG. 2, the controller 100 executes the additional injection process in the valve-closed period U1 of the intake valve 23 (step S170) in addition to the first basic injection process (step S180). In this case, the amount of the water which the controller 100 causes the water injection valve 14 to inject in the first basic injection process is 0. That is, the controller 100 does not inject water in the first basic injection process. The water collection amount W is increased by executing the additional injection process during the valve-closed period U1 of the intake valve 23 as shown in section (a) of FIG. 2. When the additional injection process is executed in one combustion cycle or multiple combustion cycles, the water collection amount W becomes greater than or equal to the specified value Wt.

The injection periods of the processes are schematically depicted to clearly show the difference between the injection periods of the injection processes and do not always coincide with actual injection periods.

(b) Relationship Between First Correction Value and Each Parameter

As described above, the first correction value H1 used to calculate the water increase amount Wnw changes depending on the temperature GT of intake air, the pressure GP of intake air, and the amount GA of intake air. The relationship between the first correction value H1 and each of the three parameters will be described in detail.

The relationship between the first correction value H1 and the temperature GT of intake air will now be described. As described above, in the first correction map N1B, when the pressure GP of intake air and the amount GA of intake air each have a certain value, the first correction value H1 becomes smaller as the temperature GT of intake air becomes higher. The following characteristic is reflected on the relationship between the temperature GT of intake air and the first correction value H1. When the temperature GT of intake air is relatively high, the water injected from the water injection valve 14 may evaporate before reaching the wall surface of the intake port 12A. Thus, when the temperature GT of intake air is relatively high, the amount of water that newly collects on the wall surface of the intake port 12A is relatively small. To reflect this characteristic on the calculation of the water increase amount Wnw, the first correction value H1 is set to be smaller as the temperature GT of intake air becomes higher.

The relationship between the first correction value H1 and the pressure GP of intake air will now be described. As described above, in the first correction map N1B, when the temperature GT of intake air and the amount GA of intake air each have a certain value, the first correction value H1 becomes smaller as the pressure GP of intake air becomes lower. The following characteristic is reflected on the relationship between the pressure GP of intake air and the first correction value H1. As a prior condition, the injection pressure of the water injection valve 14 is higher than the pressure GP of intake air. Thus, the lower the pressure GP of intake air, the larger the difference between the injection pressure of water and the pressure GP of intake air. This expedites micronization of the water injected from the water injection valve 14. In contrast, the higher the pressure GP of intake air, the smaller the difference between the injection pressure of water and the pressure GP of intake air. This limits the micronization of the water injected from the water injection valve 14. The non-micronized water tends to collect on the wall surface of the intake port 12A and become a coarse water droplet with a relatively large volume. Since the evaporation of such a coarse water droplet is limited, the water droplet may remain on the wall surface of the intake port 12A. That is, the amount of water that newly collects on the wall surface of the intake port 12A becomes larger. In this regard, when the pressure GP of intake air is relatively low, the formation of a coarse water droplet is limited. Thus, when the pressure GP of intake air is relatively low, the amount of water that newly collects on the wall surface of the intake port 12A is relatively small. To reflect this characteristic on the calculation of the water increase amount Wnw, the first correction value H1 is set to be smaller as the pressure GP of intake air becomes lower.

The relationship between the first correction value H1 and the amount GA of intake air will now be described. As described above, in the first correction map N1B, when the temperature GT of intake air and the pressure GP of intake air each have a certain value, the first correction value H1 becomes smaller as the amount GA of intake air becomes larger. The following characteristic is reflected on the relationship between the amount GA of intake air and the first correction value H1. That is, when the amount GA of intake air is relatively large, the micronization of the water injected from the water injection valve 14 is expedited. In this case, as described in relation to the pressure GP of intake air, the formation of a coarse water droplet on the wall surface of the intake port 12A is limited. Thus, when the amount GA of intake air is relatively large, the amount of water that newly collects on the wall surface of the intake port 12A is relatively small. To reflect this characteristic on the calculation of the water increase amount Wnw, the first correction value H1 is set to be smaller as the amount GA of intake air becomes larger.

(c) Relationship Between Second Correction Value and Each Parameter

As described above, the second correction value H2 used to calculate the total evaporation amount Wep changes depending on the temperature GT of intake air, the temperature Y of coolant, and the amount GA of intake air. The relationship between the second correction value H2 and each of the three parameters will be described in detail.

The relationship between the second correction value H2 and the temperature GT of intake air and the relationship between the second correction value H2 and the temperature Y of coolant will now be described. As described above, the higher the temperature GT of intake air, the larger the second correction value H2 at the same amount GA of intake air in the second correction map N2B. Likewise, the higher the temperature Y of coolant, the larger the second correction value H2. The following characteristic is reflected on the relationship. Since part of the second water jacket 89 is located around the intake ports 12A, the temperature Y of coolant may indicate the temperature of the wall surface of the intake port 12A. The temperature GT of intake air the may also indicate the temperature of the wall surface of the intake port 12A. As the temperature of the wall surface of the intake port 12A becomes higher, water readily evaporates from the wall surface. Thus, the higher the temperature Y of coolant and the temperature GT of intake air, the larger the total evaporation amount Wep. To reflect this characteristic on the calculation of the total evaporation amount Wep, the second correction value H2 is set to be larger as the temperature Y of coolant becomes higher. Further, the second correction value H2 is set to be larger as the temperature GT of intake air becomes higher. The higher the temperature GT of intake air, the larger the water vapor amount that can be contained in the intake air in the intake port 12A. This expedites the evaporation from the wall surface of the intake port 12A. The relationship between the temperature GT of intake air and the second correction value H2 is based on this characteristic.

The relationship between the second correction value H2 and the amount GA of intake air will now be described. As described above, in the second correction map N2B, when the temperature GT of intake air and the temperature Y of coolant each have a certain value, the second correction value H2 becomes larger as the amount GA of intake air becomes larger. The following characteristic is reflected on the relationship between the amount GA of intake air and the second correction value H2. The larger the amount GA of intake air, the higher the flow speed of intake air. That is, the larger the amount GA of intake air, the faster the flow of intake air at a portion proximate to the wall surface of the intake port 12A. This expedites the evaporation of water from the wall surface of the intake port 12A. Accordingly, the larger the amount GA of intake air, the larger the evaporation amount of the water from the wall surface of the intake port 12A. To reflect this characteristic on the calculation of the total evaporation amount Wep, the second correction value H2 is set to be larger as the amount GA of intake air becomes larger.

Advantages of Embodiment (1) As described in the Operation section, when the water collection amount W is relatively small, the controller 100 executes the following process even if the target injection amount Qs of water can be fully injected from the water injection valve 14 during the valve-open period U2 of the intake valve 23. The controller 100 not only injects the target injection amount Qs of water through the first basic injection process but also additionally injects water through the additional injection process during the valve-closed period U1 of the intake valve 23. As described in the Operation section, the additional injection of water during the valve-closed period U1 of the intake valve 23 increases the water collection amount W. This prevents the water collection amount W from decreasing. In addition, the injection of the target injection amount Qs of water through the first basic injection process ensures that the necessary amount of water is supplied to the cylinder 11.

(2) In the present embodiment, the controller 100 starts the additional injection process from the valve-closing time TC of the intake valve 23. In this case, water is injected when there is a sufficient time before the intake valve 23 opens. This ensures that the injected water remains in the intake port 12A for a sufficient period of time. Accordingly, the injected water readily collects on the wall surface of the intake port 12A.

(3) The higher the temperature GT of intake air, the larger the saturation water vapor amount of intake air. Thus, for the inside of the intake port 12A to be humidified by increasing the actual water vapor amount to be closer to the saturation water vapor amount when the temperature GT of intake air is relatively high, the following process is needed. A larger amount of water needs to evaporate from the wall surface of the intake port 12A when the temperature GT of intake air is relatively high than when the temperature GT is relatively low. For the evaporation, the amount of water collecting on the wall surface of the intake port 12A needs to be larger.

As described in relation to the saturation water amount map M3, the controller 100 of the present embodiment sets the specified value Wt, which is used as a threshold value of the water collection amount W to determine whether the additional injection process can be examined. The controller 100 sets the specified value Wt to be larger as the temperature GT of intake air becomes higher. Thus, when the temperature GT of intake air is relatively high, the controller 100 executes the additional injection process even if the water collection amount W is not significantly lowered. Accordingly, the higher the temperature GT of intake air, the larger the water collection amount W. That is, the intake port 12A can be constantly humidified by increasing the specified value Wt in correspondence with the temperature GT of intake air in the present embodiment.

(4) As described in relation to the additional water amount map M4, the controller 100 of the present embodiment sets the amount of water injected by the water injection valve 14 in the additional injection process to be larger as the difference between the water collection amount W and the specified value Wt becomes larger. This allows the water collection amount W to quickly become closer to the specified value Wt.

(5) As described in the Operation section, the amount of water that newly collects on the wall surface of the intake port 12A through the injection of water from the water injection valve 14 changes depending on the temperature GT of intake air, the pressure GP of intake air, and the amount GA of intake air. Taking the relation to these parameters into account, the controller 100 of the present embodiment calculates the water increase amount Wnw. Further, as described in the Operation section, the total evaporation amount Wep from the wall surface of the intake port 12A changes depending on the temperature GT of intake air, the temperature Y of coolant, and the amount GA of intake air. Taking the relation to these parameters into account, the controller 100 of the present embodiment calculates the total evaporation amount Wep. This allows the controller 100 to accurately calculate the water collection amount W.

Modifications

The above embodiment may be modified as follows. The above embodiment and the following modifications can be combined as long as the combined modifications remain technically consistent with each other.

The method for defining the first correction value H1 is not limited to the example of the above embodiment. The first correction value H1 may decrease relative to temperature GT of intake air in a stepwise manner. If the first correction value H1 is set such that the relationship between the temperature GT of intake air and the water increase amount Wnw described in the Operation section can be reflected, the water increase amount Wnw can be correctly calculated in correspondence with the temperature GT of intake air. The same applies to the pressure GP of intake air and the amount GA of intake air.

The method for calculating the water increase amount Wnw is not limited to the example of the above embodiment. That is, the method for calculating the water increase amount Wnw is not limited to multiplying the first correction value H1 by the new water amount. For example, the first correction value H1 may be added to the new water amount. The new water amount and the first correction value H1 only need to be defined such that a correct water increase amount Wnw can be obtained. The water increase amount Wnw may be calculated without using the first correction value H1. For example, if a map is created to directly calculate the water increase amount Wnw corresponding to a certain temperature GT of intake air, the first correction value H1 is unnecessary. To provide this configuration, for example, the map may be composed of mathematical expressions. The map composed of mathematical expressions may be used such that one map can include all the parameters that should be taken into account to calculate the water increase amount Wnw. If the water increase amount Wnw can be correctly calculated, any calculation method may be used.

In the same manner as the modification of the first correction value H1, the method for defining the second correction value H2 is not limited to the example of the above embodiment. If the second correction value H2 is set such that the relationship between the temperature GT of intake air and the total evaporation amount Wep can be reflected as described in the Operation section, the total evaporation amount Wep can be correctly calculated in correspondence with the temperature GT of intake air. The same applies to the temperature Y of coolant and the amount GA of intake air.

In the same manner as the modification of the water increase amount Wnw, the method for calculating the total evaporation amount Wep is not limited to the example of the above embodiment. If the total evaporation amount Wep can be correctly calculated, any calculation method may be used.

The variables taken into account to calculate the water increase amount Wnw are not limited to those in the above embodiment. Instead of, or in addition to the variables taken into account in the embodiment, other variables may be used. The number of the variables taken into account may be smaller than that in the embodiment. The same applies to the total evaporation amount Wep. In a case in which the variables taken into account the water collection amount W are changed from those in the above embodiment with a change in the number of parameters, the variables taken into account only need to include the temperature GT of intake air. If the water collection amount W is calculated based on the temperature GT of intake air, the water collection amount W can be calculated partly accurately. To calculate the water collection amount W with the pressure GP of intake air taken into account, the following calculation is preferred. Based on the relationship between the pressure GP of intake air and the water collection amount W described in the Operation section, it is generally preferred that the water collection amount W be calculated such that the water collection amount W becomes smaller as the pressure GP of intake air becomes lower. To calculate the water collection amount W with the amount GA of intake air taken into account, the following calculation is preferred. Based on the relationship between the amount GA of intake air and the water collection amount W described in the Operation section, it is generally preferred that the water collection amount W be calculated such that the water collection amount W becomes smaller as the amount GA of intake air becomes larger.

To calculate the water collection amount W, the water increase amount Wnw and the total evaporation amount Wep do not have to be calculated separately. A map may be created to calculate the water collection amount W by collectively calculating the water increase amount Wnw and the total evaporation amount Wep. In this case, the temperature GT of intake air needs to be minimally taken into account. If the water collection amount W can be correctly calculated based on the temperature GT of intake air, any method for calculating the water collection amount W may be used.

As described in the above modification, the map used to calculate the water increase amount Wnw may include mathematical expressions. The same applies to the other maps of the above embodiment. Each map only needs to correctly represent the relationship between the defined parameters.

The method for defining the additional injection amount Qad is not limited to the example of the above embodiment. For example, the additional injection amount Qad may be smaller than the achieved water amount, which is defined in the additional water amount map M4. In this case, if the additional injection amount Qad is set to be larger as the difference between the water collection amount W and the specified value Wt becomes larger, the water collection amount W can reach the specified value Wt with a smaller amount of time. The additional injection amount Qad may be a fixed value that has been defined in advance. Regardless of whether the additional injection amount Qad is relatively large, the water collection amount W can be increased if the additional injection process is executed.

The method for defining the specified value Wt is not limited to the example of the above embodiment. For example, the specified value Wt may increase relative to the temperature GT of intake air in a stepwise manner. The specified value Wt may be smaller than the specified water amount, which is the water collection amount W that allows the actual water vapor amount to reach the saturation water vapor amount. When the target injection amount Qs of water is injected by the water injection valve 14, the supply of the water to the cylinder 11 requires that the inside of the intake port 12A be kept humidified. The specified value Wt only has to be used to determine whether the additional injection process is needed to create such an environment. The specified value Wt may be a fixed value that has been defined in advance.

The injection start time of the additional injection process is not limited to the example of the above embodiment. That is, the additional injection process may be started after the valve-closing time TC of the intake valve 23. The additional injection process only needs to be executed during the valve-closed period U1 of the intake valve 23. If the first basic injection process does not overlap the injection period, the additional injection process may be executed in both the valve-closed period U1 and the valve-open period U2 of the intake valve 23. For example, as described in the modification described below, if the start time of the first basic injection process is started after the valve-opening time TS of the intake valve 23, the additional injection process may be executed from the valve-closed period U1 to the valve-open period U2 of the intake valve 23. Alternatively, for example, the additional injection process may be started immediately after the first basic injection process ends. The additional injection process may be continued until the valve-closed period U1 of the intake valve 23 in the next combustion cycle. At least part of the injection period of the additional injection process needs to fall within the valve-closed period U1 of the intake valve 23. If the additional injection process is executed during the valve-closed period U1 of the intake valve 23, the water collection amount W can be increased. In the execution of the additional injection process including the valve-open period U2 of the intake valve 23, the amount of water supplied to the cylinder 11 will not be excessive if, for example, the target injection amount Qs is adjusted based on that process. In the same manner as the correspondence with the first basic injection process described above, the injection start time of the additional injection process only needs to be set so as not to overlap the injection period of the second basic injection process.

In the single combustion cycle, the additional injection process may be executed a number of times.

The injection start time of the first basic injection process is not limited to the example of the above embodiment. The injection start time of the first basic injection process only needs to be included in the valve-open period U2 of the intake valve 23. If the target injection amount Qs of water can be fully injected during the valve-open period U2 of the intake valve 23, the injection start time of the first basic injection process may be changed. For example, when the target injection amount Qs is considerably smaller than the allowable injection amount Qv, the target injection amount Qs of water can be fully injected during the valve-open period U2 of the intake valve 23 even if the first basic injection process is started after the valve-opening time TS of the intake valve 23.

The manner of the second basic injection process is not limited to the example of the above embodiment. That is, in the second basic injection process, the target injection amount Qs of water does not have to be fully injected during a continuous injection period. For example, in the second basic injection process, the injection may be divided into two or more injections. Specifically, a first injection is performed before the intake valve 23 opens, and a second injection is performed during the valve-open period U2 of the intake valve 23 after a relatively short period of time. The entire target injection amount Qs of water only needs to be fully injected during the single combustion cycle.

When the second basic injection process is executed, the additional injection process does not have to be executed in a case in which the water collection amount W is less than the specified value Wt. The water collection amount W can be increased by injecting water from the water injection valve 14 during the valve-closed period U1 of the intake valve 23 through the second basic injection process. Thus, when the second basic injection process is executed, the water collection amount W is highly likely to become sufficiently increase even if the additional injection process is not executed.

The water collection amount W used to determine whether the additional injection process can be executed may be changed between the case in which the target injection amount Qs is less than or equal to the allowable injection amount Qv (step S130: YES) and the case in which the target injection amount Qs is greater than the allowable injection amount Qv (step S130: NO). That is, a dedicated specified value may be set for each of the two cases.

The reach period L is not limited to a fixed value and may be variably set depending on, for example, the amount GA of intake air. The reach period L may be 0. In this case, almost the target injection amount Qs of water reaches the inside of each cylinder 11.

In the above embodiment, the target region of the water collection amount W is defined for the portion of the intake port 12A on the downstream side of the tip of the water injection valve 14. However, the target region for defining the water collection amount W is not limited to the example of the above embodiment. For example, the target region for defining the water collection amount W may be the entire intake port 12A, including the portions located upstream and downstream of the tip of the water injection valve 14. The target region is suitable for a region on which water collects when water is injected from the water injection valve 14. In a case in which the target region for defining the water collection amount W is changed from the example of the above embodiment, the content of the like of the maps is also changed.

The content of the target water amount map M1 is not limited to the example in the above embodiment. The target water amount map M1 only needs to be set depending on the engine running state to inject water needed to cool the inside of the cylinder 11 by a necessary amount.

The amount of water injected from the water injection valves 14 in the first basic injection process is not limited to the example of the above embodiment. For example, the amount of water injected from the water injection valve 14 in the first basic injection process may be smaller than the target injection amount Qs. In this case, for example, if the amount of water that is relatively close to the target injection amount Qs is injected through the first basic injection process, the inside of the cylinder 11 can be cooled. Likewise, the amount of water injected from the water injection valves 14 in the second basic injection process is not limited to the example of the above embodiment.

The processes that cause the water injection valve 14 to inject water in order to supply water to the cylinder 11 are not limited to the first and second basic injection processes of the above embodiment. If an injection process is executed to cause the water injection valve 14 to inject water during the valve-open period U2 of the intake valve 23, water can be supplied to the cylinder 11. In this case, the amount of water injected by the water injection valve 14 can be changed. When the water collection amount W is less than the specified value Wt, a decrease in the water collection amount W is prevented by executing the additional injection process, which causes the water injection valve 14 to inject water during the valve-closed period U1 of the intake valve 23, in addition to an injection process that causes the water injection valve 14 to inject water during the valve-open period U2 of the intake valve 23.

When the internal combustion engine 10 is running, the pressure of water supplied to the water injection valve 14 may be changed depending on the running state of the internal combustion engine 10. In this case, various maps or the like are created to correctly control the water injection valve 14 based on the change in the pressure of water. For example, the injection map M2 defines the relationship between the injection period and the possible injection amount for each pressure of water supplied to the water injection valve 14. Such an injection map M2 allows the allowable injection amount Qv to be calculated based on the pressure of water supplied to the water injection valve 14.

The method for obtaining the crank position Scr at which the intake valve 23 reaches the valve-opening time TS is not limited to the example in the above embodiment. For example, detection values of the crank position sensor 34 and the intake cam position sensor 35 may be used to obtain the crank position Scr at which the intake valve 23 reaches the valve-opening time TS. If the crank position Scr at which the intake valve 23 reaches the valve-opening time TS can be correctly obtained, any method may be employed. The same applies to the crank position Scr at which the intake valve 23 reaches the valve-closing time TC.

The overall configuration of the internal combustion engine 10 is not limited to the example of the above embodiment. The number of the cylinders 11 may be changed. Further, for example, the installation position of the intake air temperature sensor 32 may be changed. For example, the intake air temperature sensor 32 may be located upstream of the throttle valve 3 in the intake passage 12. If the installation position of the intake air temperature sensor 32 is changed, a map is created for the installation position. As another option, for example, if the pressure GP of intake air is not taken into account to calculate the water collection amount W, the intake pressure sensor 33 may be omitted. The internal combustion engine 10 only needs to include the water injection valves 14, the intake air temperature sensor 32, and the intake valve 23.

The overall configuration of the vehicle 300 is not limited to the example of the above embodiment. For example, the vehicle 300 may include a motor generator as the driving source of the vehicle 300, in addition to the internal combustion engine 10.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for an internal combustion engine, the internal combustion engine including:
   a cylinder;
   an intake passage connected to the cylinder;
   a water injection valve configured to inject water into the intake passage;
   a temperature sensor configured to detect a temperature of intake air flowing through the intake passage; and
   an intake valve configured to selectively open and close a connection port between the intake passage and the cylinder, wherein
   a period from a time point at which a compression stroke is started to a time point at which a next compression stroke is started is referred to as a single cycle, and
   the controller comprises processing circuitry configured to execute:
      a water amount calculation process that calculates a water collection amount based on the temperature of the intake air, the water collection amount being an amount of water that collects on a wall surface of the intake passage;
      an injection process that causes the water injection valve to inject water in response to the intake valve being open in the single cycle; and
      an additional injection process that causes the water injection valve to inject water in response to the intake valve being closed in the single cycle in addition to water injection in the injection process in a case in which the water collection amount is less than a specified value that has been defined in advance.

2. The controller according to claim 1, wherein the processing circuitry is configured to:
   execute a target calculation process that calculates a target injection amount based on a running state of the internal combustion engine, the target injection amount being a target value of an amount of water supplied to the cylinder in the single cycle;
   calculate the water collection amount based on the temperature of the intake air and the target injection amount in the water amount calculation process;
   cause the water injection valve to inject the target injection amount of water in the injection process; and
   in response to the water collection amount being less than the specific value, execute the additional injection process in addition to causing the water injection valve to inject the target injection amount of water in the injection process.

3. The controller according to claim 1, wherein the processing circuitry is configured to start the additional injection process from a point in time when the intake valve closes in the single cycle.

4. The controller according to claim 1, wherein the processing circuitry is configured to set the specified value to be larger when the temperature of the intake air is relatively high than when the temperature of the intake air is relatively low.

5. The controller according to claim 1, wherein the processing circuitry is configured to set an amount of the water injected from the water injection valve in the additional injection process to be larger when a difference between the water collection amount and the specified value is relatively large than when the difference is relatively small.

6. The controller according to claim 1, wherein
   the internal combustion engine further includes
      an air flow meter configured to detect an amount of the intake air flowing through the intake passage, and
      an intake pressure sensor configured to detect a pressure of the intake air flowing through the intake passage, and
   the processing circuitry is configured to calculate the water collection amount in the water amount calculation process such that
      a value of the water collection amount is smaller when the pressure of the intake air is relatively low than when the pressure of the intake air is relatively high, and
      the value of the water collection amount is smaller when the amount of the intake air is relatively large than when the amount of the intake air is relatively small.

7. The controller according to claim 1, wherein
   the processing circuitry is configured to
      calculate a target injection amount based on a running state of the internal combustion engine, the target injection amount being a target value of an amount of water supplied to the cylinder in the single cycle, and
      calculate an allowable injection amount based on an engine rotation speed of the internal combustion engine, and
   the single cycle includes a valve-closed period during which the intake valve is closed, and a valve-open period during which the intake valve is open,
      the valve-open period including a reach period, and a period outside the reach period,
      the allowable injection amount being an amount of water allowed to be injected by the water injection valve during the period outside the reach period, and
      the reach period being a length of time for the water injected by the water injection valve to reach an inside of the cylinder.

8. The controller according to claim 7, wherein
the processing circuitry is configured to, in response to the target injection amount being greater than the allowable injection amount, cause the water injection valve to inject the target injection amount of water during a period that spans from the valve-closed period to the valve-open period in the single cycle.

9. The controller according to claim 8, wherein the processing circuitry is configured to set the specified value to be larger when the temperature of the intake air is relatively high than when the temperature of the intake air is relatively low.

10. The controller according to claim 9, wherein the processing circuitry is configured to set an amount of the water injected from the water injection valve in the additional injection process to be larger when a difference between the water collection amount and the specified value is relatively large than when the difference is relatively small.

11. The controller according to claim 10, wherein
the internal combustion engine further includes
an air flow meter configured to detect an amount of the intake air flowing through the intake passage, and
an intake pressure sensor configured to detect a pressure of the intake air flowing through the intake passage, and
the processing circuitry is configured to calculate the water collection amount in the water amount calculation process such that
a value of the water collection amount is smaller when the pressure of the intake air is relatively low than when the pressure of the intake air is relatively high, and
the value of the water collection amount is smaller when the amount of the intake air is relatively large than when the amount of the intake air is relatively small.

12. A control method for an internal combustion engine, the internal combustion engine including:
a cylinder;
an intake passage connected to the cylinder;
a water injection valve configured to inject water into the intake passage; and
an intake valve configured to selectively open and close a connection port between the intake passage and the cylinder, wherein
a period from a time point at which a compression stroke is started to a time point at which a next compression stroke is started is referred to as a single cycle,
the control method comprises:
calculating a water collection amount based on a temperature of intake air flowing through the intake passage, the water collection amount being an amount of water that collects on a wall surface of the intake passage;
executing an injection process that causes the water injection valve to inject water in response to the intake valve being open in the single cycle; and
executing an additional injection process that causes the water injection valve to inject water in response to the intake valve being closed in the single cycle in addition to water injection in the injection process in a case in which the water collection amount is less than a specified value that has been defined in advance.

* * * * *